Figure 2:
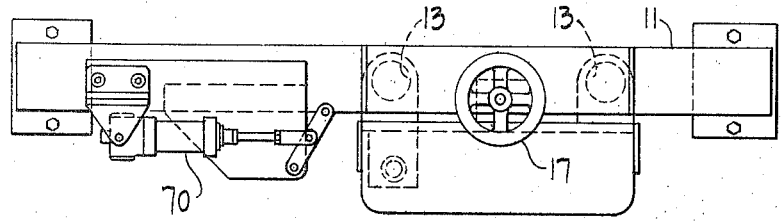

April 26, 1966  W. O. DOUD ETAL  3,247,964
INSPECTION APPARATUS
Filed May 23, 1963  5 Sheets-Sheet 1

INVENTORS.
WILBUR O. DOUD
BY CHARLES W. COOK

Arthur L. Urban
ATTORNEY.

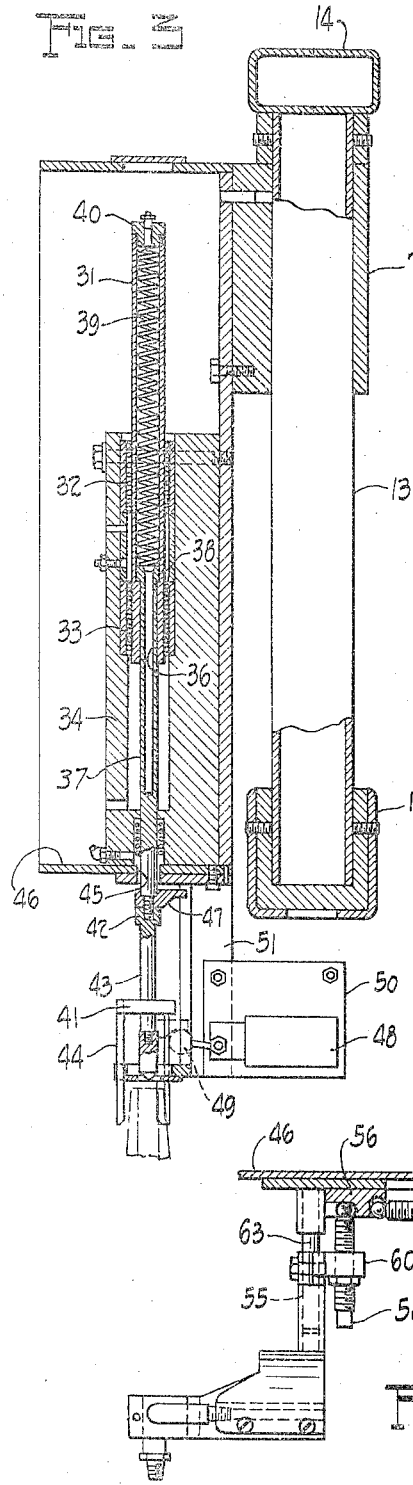
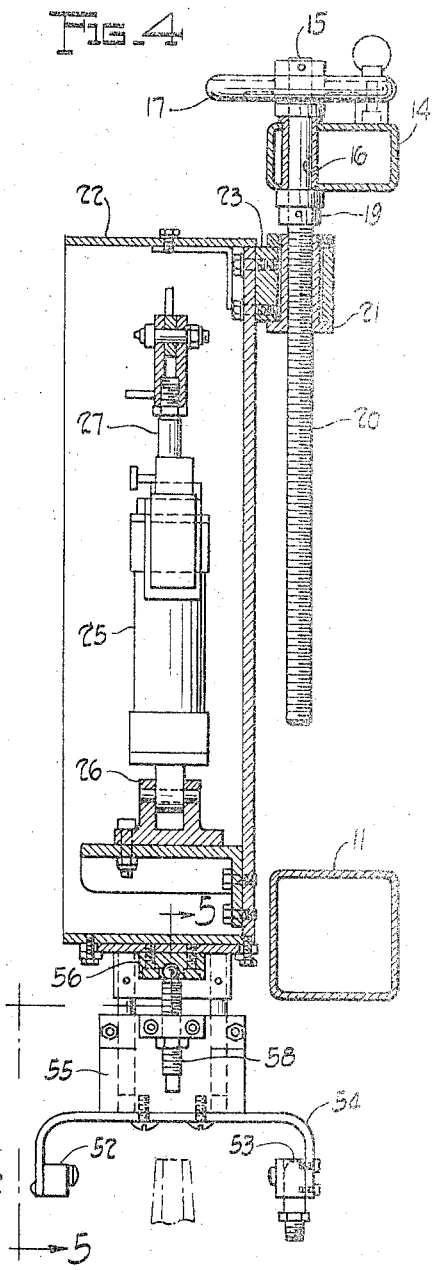

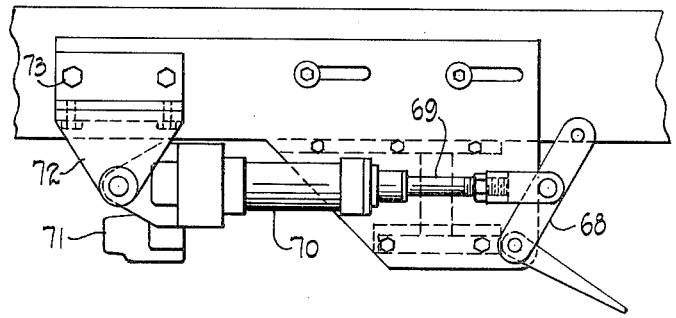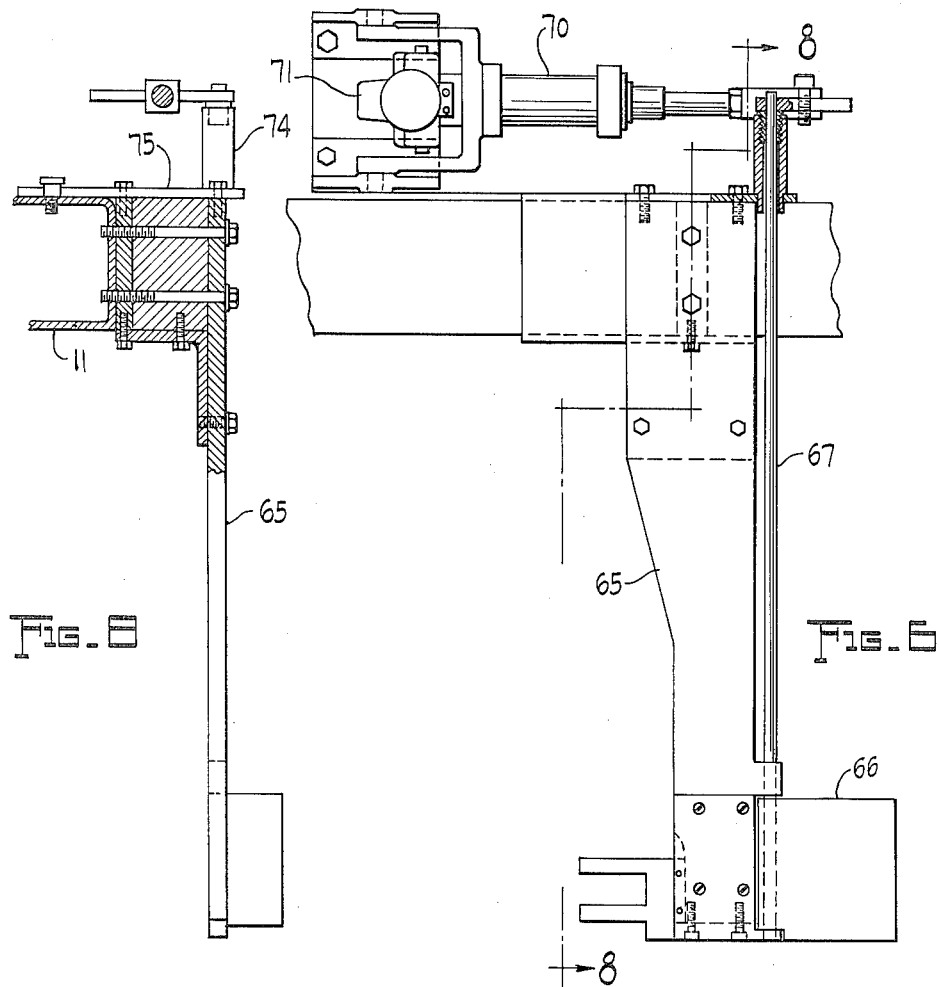

April 26, 1966   W. O. DOUD ETAL   3,247,964
INSPECTION APPARATUS
Filed May 23, 1963   5 Sheets-Sheet 4
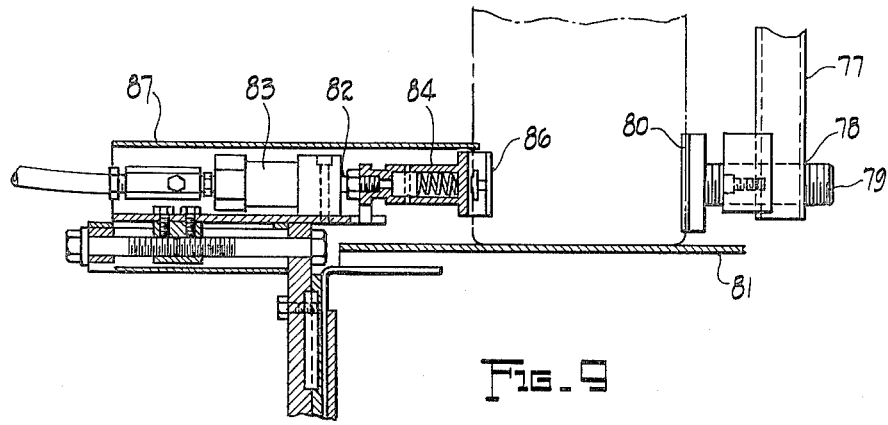
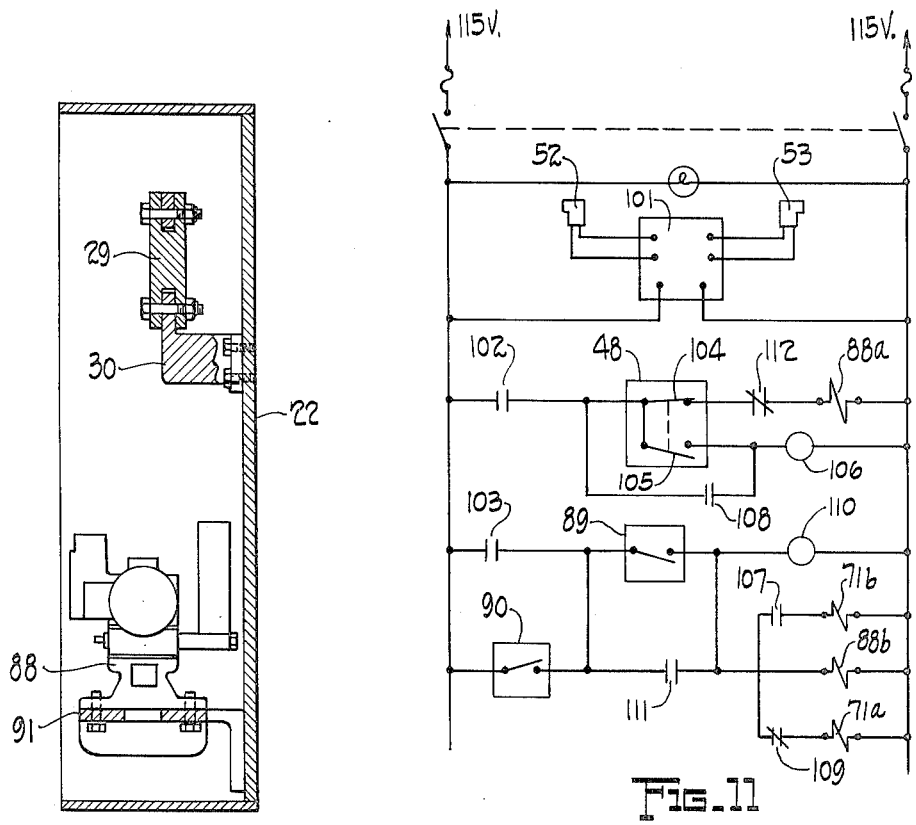
INVENTORS.
WILBUR O. DOUD
CHARLES W. COOK
BY Arthur L. Urban
ATTORNEY.

April 26, 1966 W. O. DOUD ETAL 3,247,964
INSPECTION APPARATUS
Filed May 23, 1963 5 Sheets-Sheet 5
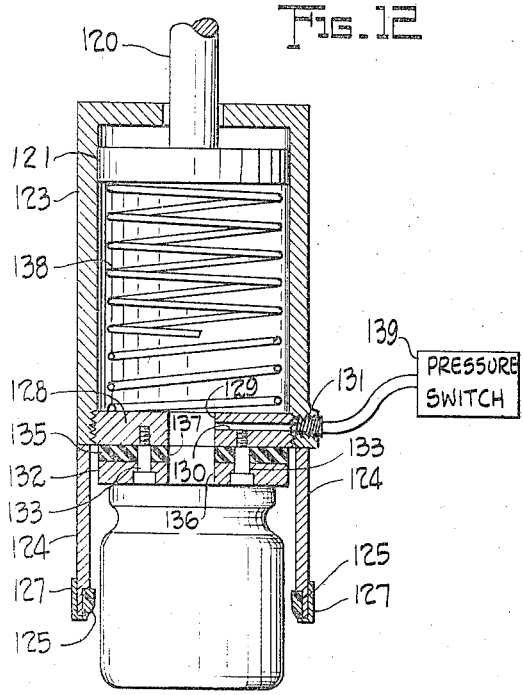
INVENTORS.
WILBUR O. DOUD
CHARLES W. COOK
BY
*Arthur L Urban*
ATTORNEY.

United States Patent Office 3,247,964
Patented Apr. 26, 1966

3,247,964
INSPECTION APPARATUS
Wilbur O. Doud and Charles W. Cook, Muncie, Ind., assignors to Ball Brothers Company Inc., Muncie, Ind., a corporation of Indiana
Filed May 23, 1963, Ser. No. 282,720
9 Claims. (Cl. 209—88)

This invention relates to new and improved apparatus for inspecting glassware for defects, and more particularly relates to novel apparatus for automatically inspecting ware for defects as it is moved in a single line along a conveyor.

Glassware, such as bottles, such as bottles and jars, is generally manufactured by shaping on forming machines and then passing the newly formed ware through an annealing lehr on a moving conveyor. In the past, it was customary to have individuals visually inspect the ware for defects as it was removed from the lehr conveyor. However, it is difficult for a person to maintain his attention on the glassware for long periods of time as it is being continuously advanced toward him because of fatigue and various distractions in the vicinity. These factors tend to seriously reduce the efficiency of the inspector so that a substantial amount of defective ware may be passed by the inspector. Furthermore, the problems of visual inspection are compounded as the production rate of the forming and annealing equipment is increased.

Although various types of automatic inspection machines have been tried in attempts to overcome the shortcomings of visual inspection methods, the machines were not considered completely successful primarily due to the complexity and size of the machines and the damage caused to the ware being inspected. The complexity and size of the machines also have made the machines expensive to manufacture and maintain.

In view of the difficulties and shortcomings of visual inspection methods and of automatic inspection machines employed heretofore, it was completely unexpected and surprising to discover apparatus for automatically inspecting glassware for defects, which is simple in design and relatively low cost to manufacture and maintain. Further, the automatic inspection apparatus of the invention affords troublefree operation at high rates of speed over long periods of time. Moreover, the design of the apparatus for automatically inspecting glassware can be modified simply and conveniently for the inspection of various types of defects on different types of ware.

Figure 1:
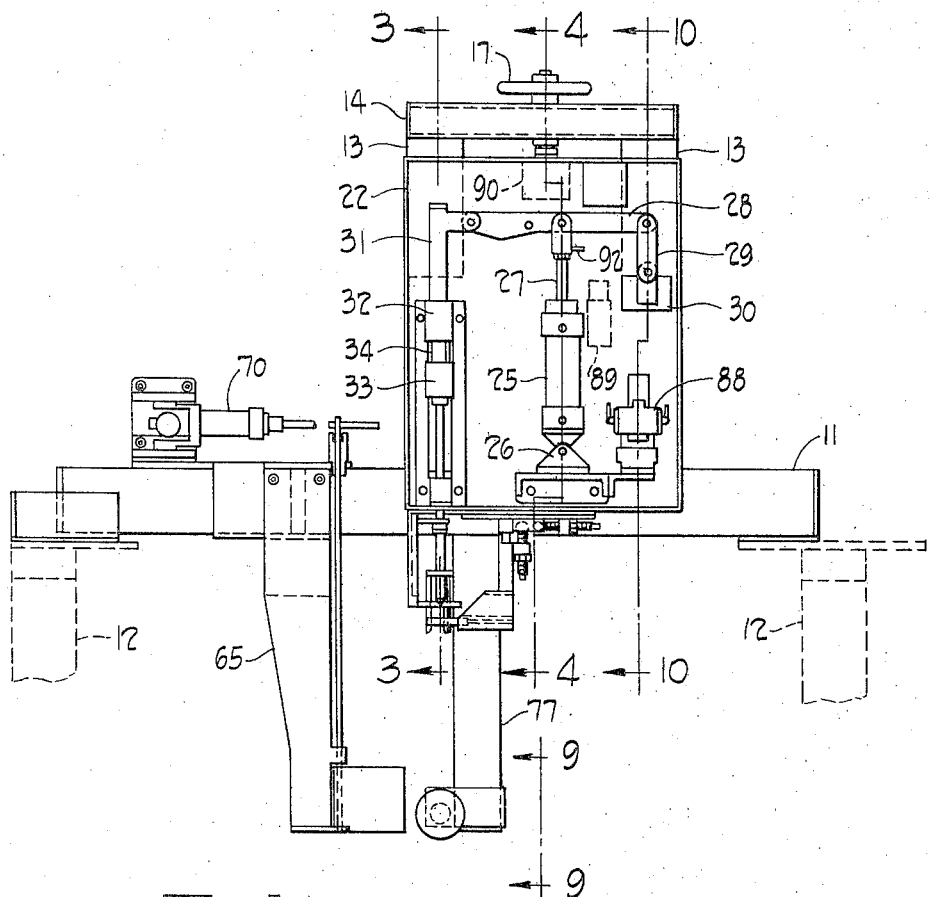

Other advantages and benefits of the apparatus of the present invention will be apparent from the following description and drawings in which:

FIGURE 1 is a side elevation of apparatus of the invention;
FIGURE 2 is a plan view of the apparatus shown in FIGURE 1;
FIGURE 3 is an enlarged sectional view taken along line 3—3 of FIGURE 1;
FIGURE 4 is an enlarged sectional view taken along line 4—4 of FIGURE 1;
FIGURE 5 is a sectional view taken along line 5—5 of FIGURE 4;
FIGURE 6 is an enlarged side elevation of the reject gate mechanism shown in FIGURE 1;
FIGURE 7 is a plan view of the reject gate mechanism;
FIGURE 8 is a sectional view taken along line 8—8 of FIGURE 6;
FIGURE 9 is an enlarged sectional view taken along line 9—9 of FIGURE 1;
FIGURE 10 is an enlarged sectional view taken along line 10—10 of FIGURE 1;
FIGURE 11 is a diagram of circuitry for the apparatus shown in FIGURE 1;
FIGURE 12 is an enlarged sectional view of another form of gauging assembly;
FIGURE 13 is an enlarged view partially in section of a different gauging assembly; and
FIGURE 14 is an enlarged side elevation of still another gauging assembly.

One form of automatic inspection apparatus of the present invention, as shown in the drawings, is mounted on a horizontal support 11 secured between uprights 12. The uprights 12 may be part of a conveyor assembly including a conveyor belt 81. Extending upwardly from the horizontal support 11 are a pair of posts 13 across the top of which is secured a channel member 14. An adjusting screw 15 is rotatably disposed within an opening 16 in channel 14 and held therein by a hand wheel 17 affixed to the upper portion of the screw and a collar 19 secured to the screw at a point below the channel 14. The lower portion 20 of the screw is threaded and engages a threaded nut 21 secured to a box 22 by means of a suitable bracket 23. Box 22 is also supported by a pair of guide blocks 24 which engage posts 13 and move vertically therealong as nut 21 is advanced along screw 15.

An air cylinder 25 is pivotally mounted within box 22 on a bracket 26. Air cylinder 25 has an upwardly extending piston rod 27 pivotally connected to a link member 28, one end of which is pivotally connected to a link 29 which in turn is pivotally connected to box 22 through a bracket 30.

The opposite end of link member 28 is connected to a cylinder 31 which moves vertically within bushings 32 and 33 which are secured within box 22 by a suitable mounting 34. Cylinder 31 has an opening 36 in the lower end thereof through which a plunger 37 extends. Plunger 37 has a head portion 38 which is larger than opening 36 to prevent the plunger from passing completely through opening 36. A coil spring 39 is disposed within the cylinder 31 with one end of the spring bearing against the head portion 38 of plunger 37 and the opposite end against a cap 40 secured within the upper portion of the cylinder.

The lower portion 42 of plunger 37 is threaded to receive a suitable gauging assembly which, as shown in the drawings, is a rod 43 with a conical bottom to which is attached a collar 41 having depending fingers 44. Plunger 37 projects downwardly from box 22 through an opening 45 in the bottom portion 46 of the box. A finger 47 is attached to the portion of plunger 37 which extends below the bottom of the box 22 for engagement with a lever 49 of a switch 48 which is affixed to a plate 50 connected to a bracket 51 depending from the bottom 46.

A photoelectric cell assembly also is mounted below the bottom 46 of the box 22 adjacent to the gauging assembly. The photo cell assembly comprises a light source 52 and a receiver 53 mounted on a transverse bracket 54 secured to a vertical plate 55. Horizontal and vertical adjustment of the photo cell assembly is effected by screws 58 and 59 which engage nuts 60 and 61, respectively. Screws 58 and 59 each have a ball portion at one end thereof, which ball portion is retained in a recess within a bracket 56 secured to the bottom 46 of the box 22. Nut 60 is secured to vertical plate 55 while nut 61 is secured to horizontally adjustable plate 62 which in turn is connected to vertical plate 55 through a member 63.

A reject gate assembly depending from horizontal support 11 comprises an arm 65 and a deflector 66 pivotally connected thereto. Rod 67 extends upwardly from deflector 66 and is secured to a link 68 which is pivotally connected to a piston rod 69 of an air cylinder 70. Air cylinder 70 which is controlled by a valve 71 is pivotally connected to horizontal support 11 through brackets 72 and 73. The end of link 68 opposite to that which engages rod 67 is pivotally connected to a bracket 74 mounted on a plate 75 attached to horizontal support 11.

A second arm 77 depends from horizontal support 11 and has a threaded opening 78 in the lower portion thereof into which is threaded a screw 79 having a head with a resilient end portion 80. As shown in FIGURE 9, on the opposite side of conveyor belt 81 from the screw 79 is positioned a piston movable in an air cylinder 83. At the end of piston rod 82 is disposed a spring-mounted clamphead 84 having a resilient end portion 81 similar to that of screw 79. The piston rod 82 and the air cylinder 83 are enclosed within a suitable housing 87 which is adjustably mounted through suitable brackets on the conveyor supporting structure.

A valve 88 and electrical switches 89 and 90 are also mounted within the box 22. The valve 88 which is supported by bracket 91 controls the flow of air to cylinders 25 and 83. Switch 89 is actuated by a finger 92 mounted on piston rod 27 and switch 90 by contact with movable link member 28.

In the operation of the apparatus of the present invention as embodied in the drawings, individual pieces of glassware moving on conveyor belt 81 approach the apparatus in a direction such that the ware first passes the photo cells 52 and 53. As the ware breaks the beam of light between source 52 and receiver 53, an electrical circuit is closed introducing air under pressure into cylinder 25 and drawing piston rod 27 downward so that link member 28 and cylinder 31 affixed thereto are moved in a downward direction.

In the interim, the movement of the ware on the conveyor is interrupted by the clamping action caused by the movement of piston rod 82 and clamphead 84 toward screw 79 positioned on the opposite side of the ware. This clamping action holds the ware in proper position so that as the cylinder 31 moves down, the plunger 37 and the gauging assembly attached thereto move downwardly toward the ware. Rod 43, as shown in the drawings, is employed to determine if the opening in the neck of the ware is sufficiently large, while fingers 44 determine if the outside diameter of the neck portion of the ware is oversize. If the neck opening is sufficiently large and the outside diameter is not oversize, plunger 37, rod 43 and fingers 44 will move downwardly into engagement with the ware until finger 47 attached to the upper portion of the gauging assembly trips lever 49 of switch 48. Also, during the downward movement of piston rod 27, finger 92 attached thereto actuates switch 89. Advantageously, switch 89 is actuated after switch 48. Also, switch 90 is actuated by the movementt of link member 28 away from the switch. Actuation of switches 48, 89 and 90 causes air under pressure to enter cylinder 25, forcing piston rod 27 upward and carrying link member 28, cylinder 31, plunger 37 and the gauging assembly in an upward direction so that rod 43 and fingers 44 are withdrawn from engagement wiith the ware. At the same time, the air pressure in cylinder 83 is released causing the clamphead 84 to move away from the surface of the ware, permitting the ware to resume its movement along conveyor belt 81.

If the ware being inspected has a neck opening which is choked, that is, of insufficient size, and/or an oversize outside neck diameter, rod 43 cannot enter the opening of the ware as it moves downward and/or fingers 44 cannot surround the ware. Since plunger 37 and the gauging assembly are spring mounted with respect to cylinder 31, the the cylinder is moved downwardly by the downward movement of piston rod 27 and link member 28 even though the gauging assembly cannot properly engage the ware. The downward movement of link member 28 actuates switch 90 and causes finger 92 on rod 27 to actuate switch 89. However, since the gauging assembly has not moved downwardly into engagement with the ware, finger 47 does not actuate switch 48.

The actuation of switches 89 and 90 without the actuation of switch 48 causes air under pressure to be introduced into cylinder 70 of the reject gate assembly which moves piston rod 69 changing the position of deflector 66 connected to the piston rod through rod 67 and link 68. Also, air under pressure is introduced into cylinder 25 to raise piston rod 27 and cylinder 31, plunger 37 and the gauging assembly. In addition, the air pressure in cylinder 83 is released so that piston rod 82 moves away from the ware freeing the ware for continuation of movement along the conveyor belt 81. Since the position of deflector 66 of the reject gate assembly has been changed, the ware will contact deflector 66 and be forced from the belt 81 as a reject.

One from of circuitry of the apparatus of the invention will be described with reference to FIGURE 11 of the drawings. Light source 52 and receiver 53 are connected to a photo relay control 101 having normally open contacts 102 and 103. Switch 48 is a double contact switch with a normally closed contact 104 and a normally open contact 105. Switches 89 and 90 are normally open single contact switches. Thus, when a piece of ware breaks the light beam between light source 52 and receiver 53, normally open contacts 102 and 103 of the photo relay control 101 are closed causing solenoid coil 88a of valve 88 to open introducing air into cylinder 25 and causing rod 27 and the gauging assembly to move downwardly. The movement of link member 28 causes normally open switch 90 to close, overriding the contacts 102 and 103 of the photo relay control 101. During the downward movement of plunger 37, finger 47 attached thereto trips switch 48 opening contact 104 and closing contact 105 which closes normally open contacts 107 and 108 and opens normally closed contact 109 of control relay 106. As the piston rod 27 moves downwardly, finger 92 secured thereto closes switch 89 closing normally open contact 111 and opening nonrmally closed contact 112 of relay 110. The closing of contact 111 causes solenoid coil 88b of valve 88 to open introducing air into air cylinder 25 to raise rod 27 and withdraw the gauging assembly from engagement with the ware. This results in finger 47 withdrawing from contact with switch 48 closing contact 104 and opening contact 105. The upward movement of piston rod 27 opens switch 89 and forces link member 28 against switch 90 to also open that switch. The return of switches 48, 89 and 90 to their normal positions, causes the air pressure in cylinder 83 to be released permitting clamphead 84 to move away from the ware and allow the ware to move along the belt 81. Resumption of the movement of the glassware along the conveyor restores the contact of the light beam from source 52 on receiver 53 and opens the contacts 102 and 103 in the photo relay control 101 so that the circuit is ready to receive a second piece of ware.

If the gauging assembly cannot properly move into engagement with the ware, finger 47 does not contact switch 48. However, the downward movement of piston rod 27 causes switch 89 to close and the movement of link member 28 away from switch 90 also causes this switch to close. The closing of switch 89 closes contact 111 of relay 110 which actuates coil 88b of valve 88 to introduce air under pressure into cylinder 25 reversing the movement of piston rod 27. At the same time, solenoid coil 71a of valve 71 is actuated to introduce air into cylinder 70 of the reject gate assembly so that the position of the deflector 66 is changed. The upward movement of piston rod 27 and link member 28 cause switches 89 and 90 to reopen which releases clamphead 84 and frees the ware for movement on the belt 81. However, the changed position of deflector 66 forces the ware off of the belt as a reject.

FIGURES 12, 13 and 14 show various attachments which may be employed in place of the gauging assembly previously described. As shown in FIGURE 12, a rod 120 of a piston 121 may be secured to plunger 37 in place of rod 43. Piston 121 is disposed within a cylinder housing 123 having a plurality of downwardly extending fingers 124. Advantageously, as shown in the drawings, fingers 124 have inwardly extending tips 125 which are secured to the ends of the fingers by a suitable mounting arrangement such as clips 127.

The housing 123 has a closure 128 with a central bore 129 and a radial passage 130. A passage 131 in housing 123 adjacent to passage 130 of closure 128 connects central bore 129 with the periphery of the housing. A face plate 132 and gasket 135 are secured to closure 128 by suitable fasteners 133. Plate 132 and gasket 135 have openings 136 and 137, respectively, corresponding to bore 129 of closure 128. A spring 138 is disposed within housing 123 and bears against piston 121 and closure 128.

The above-described gauging assembly may be employed either to gauge the outside diameter of ware or to determine whether ware has an acceptable finish or both. The finish is the top surface surrounding the opening of the ware, which surface bears against the inside of a closure. If the finish has portions which are depressed or raised, proper sealing is not achieved and leakage may occur.

In the operation of the above assembly, the introduction of air under pressure into air cylinder 25 forces piston rod 27 downward, which causes link member 28, cylinder 31 and plunger 37 also to move downward. Since piston rod 120 is attached to the end of plunger 37, rod 120 and housing 123 will move downward toward the ware being inspected. If the ware has an outside diameter of proper size, fingers 124 depending from housing 123 will surround the ware and face plate 132 will contact the finish of the ware. If the outside diameter of the ware is oversize, the fingers 124 will not be able to move downwardly around the ware. The ware will then be rejected in the same way as described above.

With ware of proper size, continued downward movement of piston rod 120 after plate 132 is in contact with the ware causes piston 121 to act against spring 138 and move downward within housing 123 so as to compress the air within housing 123 and within the ware. If substantially the entire finish of the ware is in contact with plate 132, this compression will increase the pressure of the air within the ware. The increase in pressure may be measured by a suitable gauge or switch 139 connected to passage 131 of housing 123. If the pressure increase as measured by switch 139 is insufficient, air is escaping where plate 132 contacts the finish of the ware. This indicates that a portion of the finish of the ware is not in contact with plate 132 and the ware is defective. By connecting switch 139 through appropriate circuitry to air cylinder 70 of the reject assembly, the defective ware may be separated as described above.

FIGURE 13 shows another assembly for connection to plunger 37 in place of rod 43 and fingers 44. A rotatable shaft 150 is connected to plunger 37 through a coupling 151. Shaft 150 is driven by an air motor 152 which is connected to the shaft through gears 153 and 154. Shaft 150 and gear 154 secured thereto are maintained in driving engagement with gear 153 by a suitable mounting 156 which may be movably attached to horizontal support 11. At the lower end of shaft 150 is secured a block 157 having a face plate 158. Block 157 has a vertical bore 159 therein offset from the axis of the block a distance equal to the radius of the finish of the ware being inspected. A gauging element 160 positioned in bore 159 has an upper surface in contact with a gauge 161. The gauge records changes in height by the employment of an outwardly extending finger 162 which bears against the upper surface of gauging element 160. Gauge 161 is suitably mounted above the gauging element 160. Gauge 161 is suitably monuted above the gauging element 160 such as by attaching the gauge to shaft 150 with a bracket 163.

In the operation of the above-described gauging assembly which may be employed to determine if the ware has an acceptable finish, the introduction of air under pressure into air cylinder 25 forces piston rod 27 downward, which causes link member 28, cylinder 31 and plunger 37 to also move downward. Since shaft 150 is attached to plunger 37 through coupling 151, shaft 150 and block 157 will also move downward until plate 158 attached to block 157 contacts the finish portion of the ware being inspected. The ware is positioned below block 157 so that the lower surface of gauging element 160 also contacts the finish of the ware. Air is then introduced into motor 152 to rotate shaft 150 and block 157 secured thereto. Rotation of block 157 causes gauging element 160 to move along the finish surface. If gauging element 160 during its movement around the finish encounters either a depression or a raised portion, the gauging element will be deflected with respect to finger 162 of guage 161 and the deflection recorded by gauge 161. If the deviation is greater than the tolerance permitted for the finish, the ware is defective. By connecting gauge 161 electrically with valve 71 of the reject assembly, the position of deflector 66 may be changed to separate the defective ware.

FIGURE 14 shows an attachment for use in combination with rod 43 to check the height of ware simultaneously with the gauging of the neck opening thereof. As shown in the drawings, a bracket 170 has a depending portion which extends through an opening 171 in the bottom 46 of box 22. To this depending portion is secured a gauging arm 172 which is biased in a depending position by a spring 173 which bears against the bottom 46 of box 22 and against the arm 172. A plate 174 is attached to plunger 37 above rod 43 and extends below bracket 170.

In operation, rod 43 is moved downward into the neck opening of the ware by introducing air into cylinder 25 which forces the piston rod 27 downward and causes link member 28, cylinder 31 and plunger 37 to also move downward. The downward movement of plate 174 attached to plunger 37 permits bracket 170 to move downward and carries arm 172 into contact with the top of the ware. A suitable gauge 175 records the position of the arm 172 and thereby measures the height of the ware being inspected. Gauge 175 may be electrically connected to the reject assembly so that when the gauge records a height outside the tolerances permited, deflector 66 will move into its reject position.

The above description and drawings show that the present invention provides apparatus for automatically inspecting glassware for defects, which is simple in design and relatively low cost to manufacture and maintain. Moreover, the design of automatic inspection apparatus of the invention affords trouble-free operation at high rates of speed over long periods of time. Furthermore, the apparatus of the invention may be modified simply and conveniently for the inspection of various types of defects on different types of ware.

It will be apparent from the above description that various modifications in the apparatus described in detail and shown in the drawings may be made within the scope of the invention. For example, the arrangement of the various sub-assemblies of the apparatus may be changed for particular operating conditions or space requirements. Therefore, the invention is not intended to be limited to the specific details of the apparatus described herein except as may be required by the following claims.

What is claimed is:

1. Apparatus for inspecting glassware which comprises ware positioning means at an inspection station; a movable gauging assembly disposed adjacent to said inspection station and mounted for movement toward and away from said inspection station; actuating means yieldably connected to said gauging assembly; first switch means mounted for actuation when said gauging assembly is in a position remote from said inspection station; second switch means mounted for actuation when said gauging assembly is at said inspection station; and third switch means mounted for actuation when said gauging assembly is in an extended position at said inspection station; diverting means to separate defective ware; and circuit means connected to said first, second and third switch means to actuate said ware positioning means when said first and second switch means are actuated and also to actuate said diverting means when said first and second switch means are actuated but said third switch means is not actuated.

2. Apparatus for inspecting glassware being advanced by a conveyor belt which comprises means for interrupting movement of ware on said belt at an inspection station; a movable gauging assembly disposed adjacent to said inspection station and mounted for movement toward and away from said inspection station; actuating means yieldably connected to said gauging assembly; first switch means mounted for actuation when said gauging assembly is in a position remote from said inspection station; second switch means mounted for actuation when said gauging assembly is at said inpection station; and third switch means mounted for actuation when said gauging assembly is in an extended position at said inspection station; diverting means to separate defective ware; and circuit means connected to said first, second and third switch means to actuate said ware interrupting means when said first and second switch means are actuated and also to actuate said diverting means when said first and second switch means are actuated but said third switch means is not actuated.

3. Apparatus for inspecting glassware being advanced by a conveyor belt which comprises means for interrupting movement of ware on said belt at an inspection station, including a photoelectric cell; a movable gauging assembly disposed above said ware and mounted for movement toward and away from said ware; actuating means yieldably connected to said gauging assembly including a link member and a fluid pressure cylinder, said link member being pivotably connected to said gauging assembly and to said fluid pressure cylinder; first switch means mounted for actuation when said link member moves into a fully raised position; second switch means mounted for actuation when said link member is in a fully lowered position and third switch means mounted for actuation when said gauging assembly is in a fully extended position; diverting means including a deflector plate to move defective ware off of said conveyor belt; and circuit means connected to said first, second and third switch means to actuate said ware interrupting means when said first and second switch means are actuated and also to actuate said diverting means when said first and second switch means are actuated but said third switch means is not actuated.

4. Apparatus for inspecting glassware being advanced by a conveyor belt which comprises means for interrupting movement of ware on said belt at an inspection station; a movable gauging assembly disposed adjacent to said inspection station and mounted for movement toward and away from said inspection station; actuating means yieldably connected to said gauging assembly including a link member and a fluid pressure cylinder; said link member pivotably connecting said gauging assembly and said fluid pressure cylinder; said gauging assembly including ware-engaging means extending from a housing, a coil spring disposed within said housing and bearing against said ware-engaging means to yieldably maintain said means in an extended position; diverting means to separate defective ware; and switch means for controlling movement of said gauging assembly.

5. Apparatus for inspecting glassware which comprises a conveyor belt; means for interrupting movement of ware on said belt; a movable gauging assembly disposed above said ware and mounted for movement toward and away from said ware; actuating means yieldably connected to said gauging assembly including a link member and a fluid pressure cylinder; said link member being pivotably connected to said gauging assembly and to said fluid pressure cylinder; said gauging assembly including ware-engaging means extending from a cylindrical housing, and biasing means disposed within said housing and bearing against said ware-engaging means; diverting means to move defective ware off of said conveyor belt; and circuit means including switch means for controlling movement of said gauging assembly into and out of engagement with said ware.

6. Apparatus for inspecting glassware being advanced by a conveyor belt which comprises means for interrupting movement of ware on said belt at an inspection station, including a movable clamphead; a movable gauging assembly disposed adjacent said inspection station and mounted for movement toward and away from said inspection station; actuating means yieldably connected to said gauging assembly including a link member and a fluid pressure cylinder; said link member pivotably connecting said gauging assembly and said fluid pressure cylinder; said gauging assembly including ware-engaging means disposed within a housing, a coil spring disposed within said housing and bearing against said ware-engaging means; diverting means including a deflector plate to separate defective ware; and switch means for controlling movement of said gauging assembly.

7. Apparatus for inspecting glassware which comprises a conveyor belt; means for interrupting movement of ware on said belt at an inspection station, including a photoelectric cell and a movable clamphead; a movable gauging assembly disposed above said ware and mounted for movement toward and away from said ware; actuating means yieldably connected to said gauging assembly including a link member and a fluid pressure cylinder; said link member being pivotably connected to said gauging assembly and to said fluid pressure cylinder; said gauging assembly including ware-engaging means extending from a cylindrical housing, and biasing means disposed within said housing and bearing against said ware-engaging means; diverting means including a deflector plate to move defective ware off of said conveyor belt; and circuit means including switch means for controlling movement of said gauging assembly into and out of engagement with said ware; said ware-engaging means including means for increasing the fluid pressure inside said ware and means for measuring the said increased pressure.

8. Apparatus for inspecting glassware which comprises a conveyor belt; means for interrupting movement of ware on said belt including a photoelectric cell and a movable clamphead; a movable gauging assembly disposed above said ware and mounted for movement toward and away from said ware; actuating means yieldably connected to said gauging assembly including a link member and a fluid pressure cylinder; said link member being pivotably connected to said gauging assembly and to said fluid pressure cylinder; said gauging assembly including ware-engaging means extending from a cylindrical housing and a coil spring disposed within said housing and bearing against said ware-engaging means; diverting means including a deflector plate and a fluid pressure cylinder to move defective ware off of said conveyor belt; and circuit means including switch means for controlling movement of said gauging assembly into and out of engagement with said ware; said ware-engaging means including a rod to enter the opening of the ware and fingers to surround the body of the ware.

9. Apparatus for inspecting glassware being advanced by a conveyor belt which comprises means for interrupting movement of ware on said belt at an inspection station, including a movable clamphead; a movable gauging assembly disposed adjacent said inspection station and mounted for movement toward and away from said inspection station; actuating means yieldably connected to said gauging assembly including a link member and a fluid pressure cylinder; said link member pivotably connecting said gauging assembly and said fluid pressure cylinder; said gauging assembly including ware-engaging means disposed within a housing pivotably connected to said link member, a coil spring disposed within said housing and bearing against said ware-engaging means to maintain said means in an extended position; first switch means mounted for actuation when said link member moves into a fully raised position; second switch means mounted for actuation when said link member is in a fully lowered position and third switch means mounted for actuation when said gauging assembly is in a fully extended position; diverting means including a deflector plate to move defective ware off of said conveyor belt; and circuit means connected to said first, second and third switch means to actuate said ware interrupting means when said first and second switch means are actuated and also to actuate said diverting means when said first and second switch means are actuated but said third switch means is not actuated.

References Cited by the Examiner
UNITED STATES PATENTS

| | | | |
|---|---|---|---|
| 2,352,091 | 6/1944 | Fedorchak | 209—88 |
| 2,407,062 | 9/1946 | Darrah | 209—75 X |
| 2,759,600 | 8/1956 | Saylor | 209—80 |
| 3,012,665 | 12/1961 | Hanot | 209—80 |

ROBERT B. REEVES, *Primary Examiner.*